United States Patent
Yamaguchi et al.

(10) Patent No.: US 9,935,523 B2
(45) Date of Patent: Apr. 3, 2018

(54) MECHANICAL DEVICE

(71) Applicant: Mitsubishi Electric Corporation, Tokyo (JP)

(72) Inventors: Shinichi Yamaguchi, Tokyo (JP); Koki Naka, Tokyo (JP); Takuro Isogai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 524 days.

(21) Appl. No.: 14/397,600

(22) PCT Filed: Mar. 18, 2014

(86) PCT No.: PCT/JP2014/057371
§ 371 (c)(1),
(2) Date: Oct. 28, 2014

(87) PCT Pub. No.: WO2015/140929
PCT Pub. Date: Sep. 24, 2015

(65) Prior Publication Data
US 2016/0261167 A1 Sep. 8, 2016

(51) Int. Cl.
*H02K 7/10* (2006.01)
*H02K 17/16* (2006.01)
(Continued)

(52) U.S. Cl.
CPC ........... *H02K 7/1004* (2013.01); *H02K 7/116* (2013.01); *H02K 17/16* (2013.01); *H02K 17/32* (2013.01)

(58) Field of Classification Search
CPC ...... H02K 17/32; H02K 7/1004; H02K 17/16; H02K 7/116
(Continued)

(56) References Cited

U.S. PATENT DOCUMENTS 5,838,135 A 11/1998 Satake et al.
6,154,003 A 11/2000 Satake et al.
(Continued)

FOREIGN PATENT DOCUMENTS

EP 1 762 166 A2 3/2007
JP 64-74048 A 3/1989
(Continued)

OTHER PUBLICATIONS

Translation of foreign document JP 04263947 A (Year: 1992).*
(Continued)

*Primary Examiner* — Alex W Mok
(74) *Attorney, Agent, or Firm* — Sughrue Mion, PLLC

(57) ABSTRACT

To maximize a power consumption reduction effect in a case of using a high-efficiency induction motor, when a conventional induction motor is changed to a high-efficiency induction motor, a mechanical device including an induction motor and a speed reduction mechanism related to the present invention increases the reduction ratio of the speed reducer such that the rotation speed of the mechanical device is equal to that in a case of using a conventional induction motor and thus the output of the mechanical device is made equal to that in a case of using a conventional inductor motor; therefore, the load conditions of the mechanical device such as a pump and a fan can be made equal to those in a case of using a conventional induction motor. Accordingly, the power consumption reduction effect by improving the efficiency of the induction motor can be maximized.

11 Claims, 4 Drawing Sheets

(51) Int. Cl.
  *H02K 7/116* (2006.01)
  *H02K 17/32* (2006.01)
(58) Field of Classification Search
  USPC .......................................................... 310/83
  See application file for complete search history.

(56) References Cited

U.S. PATENT DOCUMENTS

| | | | |
|---|---|---|---|
| 6,176,163 B1 | 1/2001 | Kramer | |
| 6,333,577 B1* | 12/2001 | Kusumoto | H02K 7/10 310/100 |
| 8,105,200 B2* | 1/2012 | Dettenberger | B60T 13/746 475/156 |
| 2006/0117885 A1* | 6/2006 | Robson | B60T 13/02 74/413 |
| 2007/0056139 A1 | 3/2007 | Lee et al. | |
| 2008/0018284 A1* | 1/2008 | Kinpara | H02P 21/14 318/490 |
| 2008/0293534 A1* | 11/2008 | Dettenberger | B60T 13/746 475/154 |
| 2009/0021021 A1 | 1/2009 | Grenier | |
| 2010/0054956 A1* | 3/2010 | Kitani | B66C 13/20 417/26 |
| 2010/0156102 A1 | 6/2010 | Grenier | |
| 2011/0031344 A1 | 2/2011 | Grenier | |
| 2012/0266487 A1* | 10/2012 | Moretto | B29B 13/065 34/474 |

FOREIGN PATENT DOCUMENTS

| | | |
|---|---|---|
| JP | 3-117347 A | 5/1991 |
| JP | 4-263947 A | 9/1992 |
| JP | 5-24767 A | 2/1993 |
| JP | 9-19116 A | 1/1997 |
| JP | 9-294348 A | 11/1997 |
| JP | 11-209028 A | 8/1999 |
| JP | 11-320310 A | 11/1999 |
| JP | 2001-120880 A | 5/2001 |
| JP | 2002-302369 A | 10/2002 |
| JP | 2011-58572 A | 3/2011 |
| JP | 2011-528548 A | 11/2011 |
| JP | 2014-31749 A | 2/2014 |
| JP | 5677644 B1 | 2/2015 |
| KR | 100645380 B1 | 11/2006 |

OTHER PUBLICATIONS

Communication dated Feb. 9, 2016 from the Japanese Patent Office in counterpart application No. 2014-254289.
Communication dated Mar. 17, 2016, issued by the Korean Intellectual Property Office in corresponding Korean Application No. 10-2015-7000937.
Japanese Office Action for JP 2014-536039 dated Sep. 16, 2014.
International Search Report for PCT/JP2014/057371 dated Jun. 10, 2014.
Communication dated Feb. 22, 2017 from the State Intellectual Property Office of the P.R.C. In counterpart Application No. 201480001867.7.
Communication dated Oct. 30, 2017 from the State Intellectual Property Office of the P.R.C. in counterpart Application No. 201480001867.7.

* cited by examiner

MECHANICAL DEVICE

CROSS REFERENCE TO RELATED APPLICTAIONS

This application is a National Stage of International Application No. PCT/JP2014/057371 filed Mar. 18, 2014, the contents of which are incorporated herein by reference in the entirety.

FIELD

The present invention relates to a mechanical device.

BACKGROUND

Conventional induction motors have been used in various mechanical devices such as pumps, blowers (fans), and compressors to suppress and reduce energy consumption. To further reduce the power consumption, the efficiency of induction motors themselves has been improved and control methods for mechanical devices have been developed.

For example, Patent Literature 1 discloses a technology in which control is performed in a maximum steady-state rotation-speed range such that the acceleration rotation in which the mechanical device is accelerated and rotated by the motor and the inertial rotation in which the motor is de-energized and the mechanical device is rotated by inertia are repeated alternately, thereby maintaining the rotation of the mechanical device within the maximum steady-state rotation-speed range, and during the inertial rotation in which the motor is de-energized and the mechanical device is rotated by inertia, the motor is de-energized and thus the power consumption is reduced.

CITATION LIST

Patent Literature

Patent Literature 1: Japanese Patent Application Laid-open No. 2001-120880

SUMMARY

Technical Problem

However, the conventional technology described above cannot be applied to a mechanical device that uses an induction motor rotating at rated speed. When a high-efficiency induction motor is used for a mechanical device, the rotation speed of the high-efficiency induction motor tends to be higher than that of a conventional induction motor (non-high-efficiency induction motor) at the same output. For this reason, there is a problem in that along with an increase in the rotation speed of the induction motor, the mechanical output of the pump device itself is also increased and thus the power consumption cannot be sufficiently reduced because of the increase in the output.

The present invention has been achieved in view of the above and an object of the present invention is to obtain a mechanical device for which a high-efficiency induction motor that can sufficiently reduce the power consumption is used.

Solution to Problem

In order to solve the above problems and achieve the object, the present invention relates to a mechanical device including: an induction motor that rotates a small-diameter pulley (or a small-diameter gear); and a device including a rotation mechanism having a large-diameter pulley driven by a rotation operation of the small-diameter pulley (or the small-diameter gear) connected thereto, wherein an increment in a rotation speed caused by using a high-efficiency induction motor as the induction motor is offset in the large-diameter pulley (or the large-diameter gear) by increasing a reduction ratio, which is a ratio of a diameter of the large-diameter pulley (or the large-diameter gear) to a diameter of the small-diameter pulley (or the small-diameter gear), and an increase in a rotation speed of the large-diameter pulley (or the large-diameter gear) due to the increment in a rotation speed caused by using a high-efficiency induction motor as the induction motor is suppressed.

Advantageous Effects of Invention

According to the present invention, an effect is obtained where it is possible to obtain a mechanical device for which a high-efficiency induction motor that can sufficiently reduce the power consumption is used.

DESCRIPTION OF EMBODIMENTS

Exemplary embodiments of a mechanical device according to the present invention will be explained below in detail with reference to the drawings. The present invention is not limited to the embodiments.

Embodiment

Figure 1:
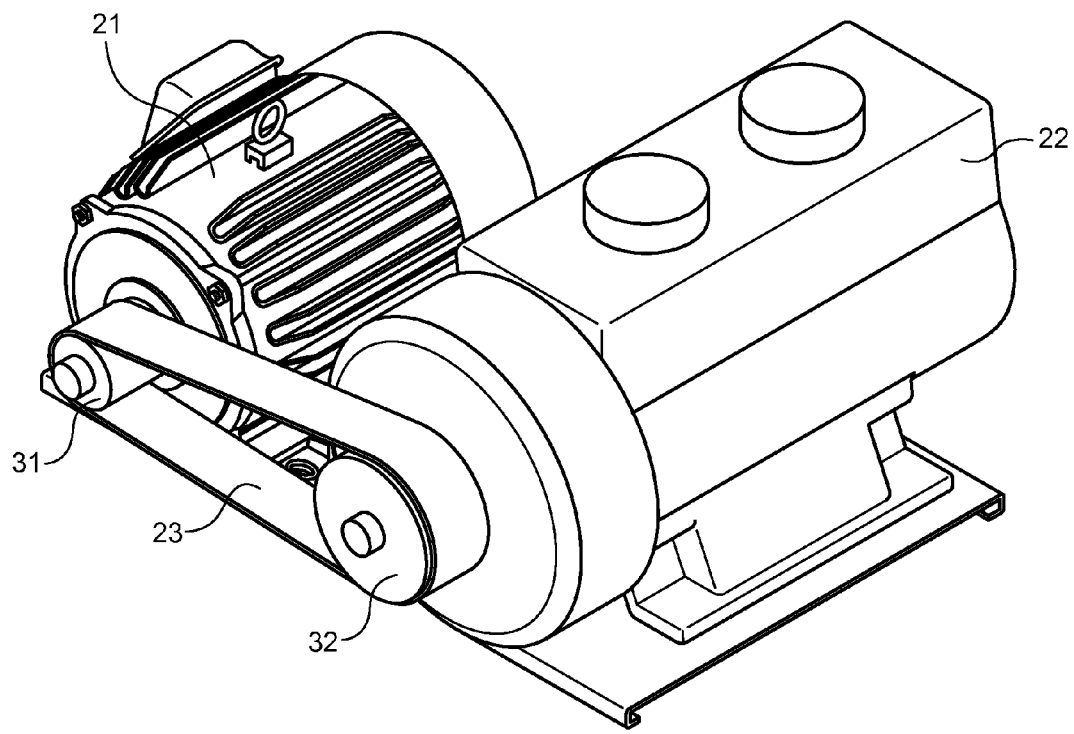
FIG. 1 is a perspective view of an appearance of a mechanical device according to an embodiment.

FIG. 1 is a perspective view of an appearance of a mechanical device according to an embodiment of the present invention. The mechanical device shown in FIG. 1 is a pump device including an induction motor (a motor) and a speed reduction mechanism, and includes an induction motor 21, a pump 22, a belt 23, and pulleys (a small-diameter pulley 31 on the side of the induction motor 21 and a large-diameter pulley 32 on the side of the pump 22). The induction motor 21 of the mechanical device shown in FIG. 1 is a high-efficiency induction motor. The high-efficiency induction motor means an induction motor having higher efficiency and a higher rotation speed at the same output than those of a conventional non-high-efficiency induction motor.

Figure 2:
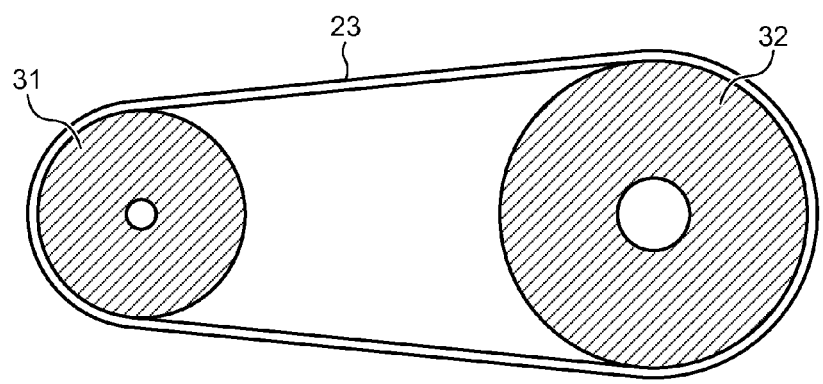
FIG. 2 is a cross-sectional enlarged view of a belt pulley in the mechanical device according to the embodiment.

FIG. 2 is a cross-sectional enlarged view of a belt pulley in the mechanical device shown in FIG. 1. In the belt pulley shown in FIG. 2, the diameter of the large-diameter pulley 32 with respect to the diameter of the small-diameter pulley 31 is larger than that of in the conventional device. For example, if the ratio of the diameter of a small-diameter pulley to the diameter of a large-diameter pulley in the conventional device is 30:40, the ratio of the diameter of the small-diameter pulley to the diameter of the large-diameter pulley according to the present embodiment is set to 30:41. When the diameter of the large-diameter pulley with respect to the diameter of the small-diameter pulley is increased, it is possible to increase the reduction ratio when a high-efficiency induction motor is used. While the reduction ratio in the conventional device is 40/30, in this example, the reduction ratio is 41/30. Specifically, assuming that the rotation speed of the induction motor 21 is denoted by $N_m$ and the ratio of a diameter $D_s$ of the small-diameter pulley 31 to a diameter $D_L$ of the large-diameter pulley 32 is denoted by $D_S:D_L$, a rotation speed $N_p$ of the pump is represented by the following equation (1) using the reduction ratio $a=D_L/D_S$.

$$N_p = \frac{D_S}{D_L} N_m = \frac{N_m}{D_L/D_S} = \frac{N_m}{a} \tag{1}$$

According to the above equation (1), when a conventional induction motor is changed to a high-efficiency induction motor, if the ratio of the diameter $D_S$ of the small-diameter pulley 31 to the diameter $D_L$ of the large-diameter pulley 32 is changed from 30:40 to 30:41 as in the example described above, while the relationship between a rotation speed $N_{p1}$ of the pump in the case of using the conventional induction motor and a rotation speed $N_{m1}$ of the conventional induction motor is $N_{p1}=0.75N_{m1}$, the relationship between a rotation speed $N_{p2}$ of the pump in the case using the high-efficiency induction motor and a rotation speed $N_{m2}$ of the high-efficiency induction motor becomes $N_{p2}=0.73N_{m2}$. Meanwhile, the rotation speed $N_{m2}$ of the high-efficiency induction motor becomes higher than the rotation speed $N_{m1}$ of the conventional induction motor at the same output ($N_{m1}<N_{m2}$). As in the present embodiment, when the reduction ratio in the case of using the high-efficiency induction motor is increased as compared to the reduction ratio in the case of using the conventional induction motor, the rotation speed $N_{p1}$ of the pump in the case of using the conventional induction motor becomes substantially equal to the rotation speed $N_{p2}$ of the pump in the case of using the high-efficiency induction motor. Accordingly, the mechanical output does not change before and after the induction motor is changed, and thus it is possible to reduce the power consumption due to improvement in the efficiency of the induction motor 21.

Figure 3:
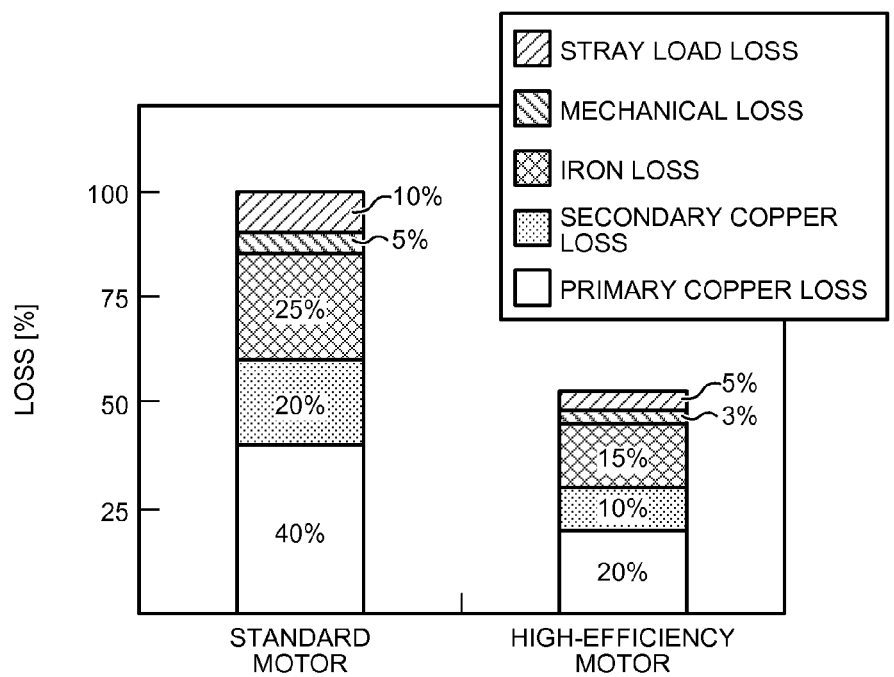
FIG. 3 is a diagram showing the loss comparison of a general conventional induction motor (a standard motor) and a high-efficiency induction motor (a high-efficiency motor) in the mechanical device according to the embodiment.

Next, the rotation speed of the high-efficiency induction motor is explained. FIG. 3 is a diagram showing the loss comparison of a general conventional induction motor (a standard motor) and the high-efficiency induction motor (a high-efficiency motor). The loss shown in FIG. 3 includes primary copper loss, secondary copper loss, iron loss, stray load loss, and mechanical loss. With reference to FIG. 3, as compared to the general conventional induction motor, the primary copper loss and the secondary copper loss are reduced in the high-efficiency induction motor. This is because in the high-efficiency induction motor, the efficiency of the induction motor is improved, that is, the loss thereof is reduced, and thus the primary resistance and the secondary resistance are reduced.

The resistance and the rotation speed of the induction motor are further explained. The motor output of the induction motor can be represented by the following equation (2).

$$P_M = \frac{3V^2(1-s)\frac{r_2}{s}}{\left(r_1 + \frac{r_2}{s}\right)^2 + (x_1 + x_2)^2} \tag{2}$$

In the equation (2), $P_M$ denotes a motor output, V denotes a power supply voltage, s denotes a slip, $r_1$ denotes primary resistance, $r_2$ denotes secondary resistance, $x_1$ denotes primary reactance, and $x_2$ denotes secondary reactance. Generally, an induction motor has a relationship of $s \ll 1$ at rated operation, and thus the relationship between the slip and the output can be approximated by the following equation (3) using the above equation (2).

$$P_M \approx \frac{3V^2(1-s)s}{r_2} \tag{3}$$

Based on the above equation (3), the slip "s" at constant output is represented by the following equation (4).

$$s = 0.5 - \sqrt{\frac{1}{4} - \frac{r_2 P_M}{3V^2}} \approx \frac{r_2 P_M}{3V^2} = kr_2 \tag{4}$$

Based on the above equation (4), a rotation speed N of a motor at constant output is represented by the following equation (5).

$$N = N_0(1-s) = N_0(1-kr_2) = \frac{60 f_e}{p}\left(1 - \frac{r_2 P_M}{3V^2}\right) \tag{5}$$

In the equation (5), $N_0$ denotes a synchronous rotation speed, $f_e$ denotes a power-supply frequency, and p denotes the number of pole pairs of the induction motor. When the secondary resistance is reduced, the slip of the induction motor at the rated power is also reduced as can be seen from the above equation (4), and the rotation speed thereof is increased as can be seen from the above equation (5).

Figure 4:
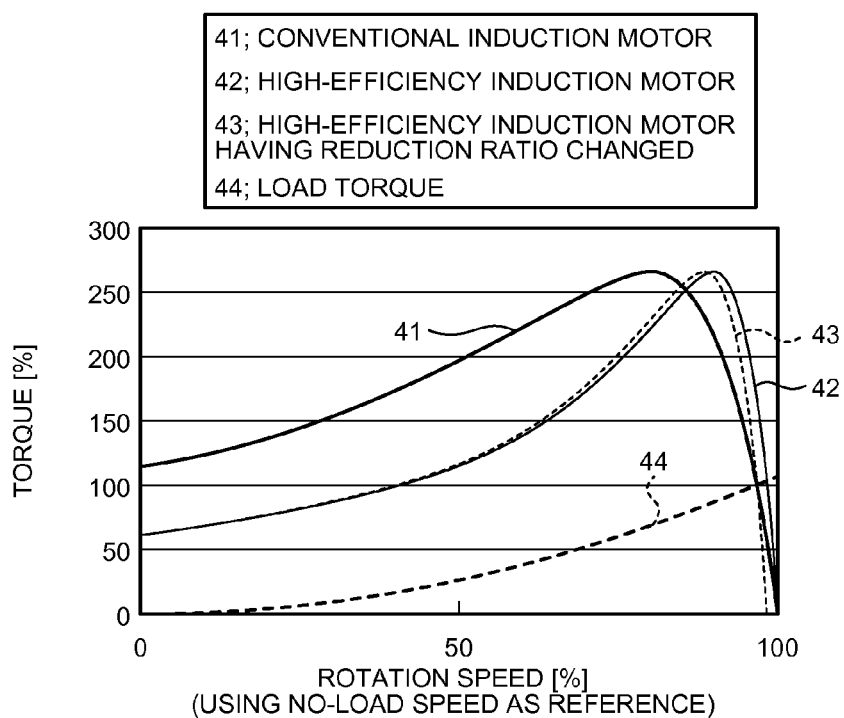
FIG. 4 is a diagram showing the relationship between the rotation speed and the torque in an induction motor in the mechanical device according to the embodiment.
Figure 5:
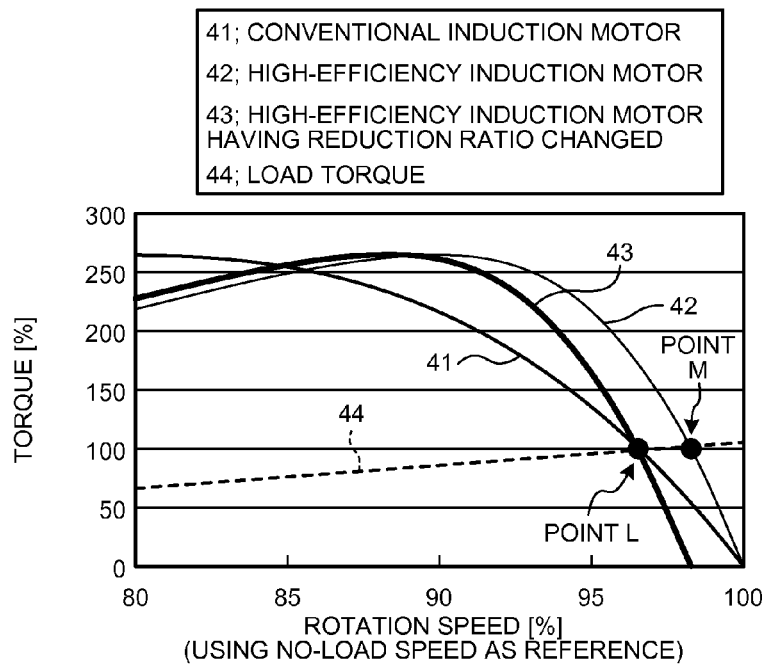
FIG. 5 is a diagram (an enlarged view of FIG. 4) showing the relationship between the rotation speed and the torque in the induction motor in the mechanical device according to the embodiment.

FIG. 4 is a diagram showing the relationship between the rotation speed and the torque in the induction motor. FIG. 5 is an enlarged view of FIG. 4 showing the relationship between the rotation speed and the torque in the induction motor. In FIGS. 4 and 5, a curve 41 indicates a curve in a case of the conventional induction motor, a curve 42 indicates a curve in a case of the high-efficiency induction motor, and a curve 43 indicates a curve in a case of the high-efficiency induction motor having the reduction ratio changed. FIGS. 4 and 5 also show the relationship (curve 44) between the rotation speed and the load torque in general use. The intersection points of the load torque (curve 44) and the speed torque of the induction motor (curves 41, 42, and 43) are operation points.

In FIG. 5, on the basis of the load torque in general use, the operation point of the conventional induction motor is point L (the intersection point of the curve 41 and the curve 44) and the operation point of the high-efficiency induction motor is point M (the intersection point of the curve 42 and the curve 44). This is because the secondary resistance is reduced in the high-efficiency induction motor and thus the slip of the induction motor at the rated power is also reduced and the rotation speed is increased. Therefore, both the speed and the torque at point M become larger than those at point L. As a result, the output is increased. Along with the increase in the output, the input power is also increased. As a result, while the efficiency of the induction motor is improved, the power consumption of the mechanical device may be increased.

Meanwhile, FIGS. 4 and 5 also show characteristics (the curve 43) in the case where the reduction ratio in the case of using the high-efficiency induction motor is set larger than that in the case of using the conventional induction motor. With reference to FIGS. 4 and 5, by setting the reduction ratio in the case of using the high-efficiency induction motor larger than that in the case of using the conventional induction motor, the rotation speed of the mechanical device in the case of using the conventional induction motor becomes substantially equal to the rotation speed of the mechanical device in the case of using the high-efficiency induction motor at point L, and the mechanical output does not change before and after the induction motor is changed. In this manner, according to the present embodiment, there is no increase in input power due to an increase in the output of the mechanical device and it is possible to obtain the power consumption reduction effect by improving the efficiency of the induction motor.

The reduction ratio may be determined by focusing attention on the fact that the rotation speed of the induction motor changes depending on the secondary resistance. Assuming that the reduction ratio in the case of using the conventional induction motor is denoted by $\alpha$, the reduction ratio in the case of using the high-efficiency induction motor is denoted by $\beta$, the secondary resistance of the conventional induction motor is denoted by $r_2$, and the secondary resistance of the high-efficiency induction motor is denoted by $A \cdot r_2$ (A is the ratio between the secondary resistance of the conventional induction motor and that of the high-efficiency induction motor), the conditions for causing the rotation speed $N_p$ of the mechanical device in the case of using the conventional induction motor to be equal to that in the case of using the high-efficiency induction motor are represented by the following equation (6) on the basis of the above equation (5) and the like and $N_p = N_1/\alpha = N_2/\beta$.

$$\text{increase rate of } reductionratio = \frac{\beta}{\alpha} = \frac{N_2}{N_1} = \frac{N_0(1 - Akr_2)}{N_0(1 - kr_2)} = \frac{N_0(1 - As)}{N_0(1 - s)} \approx (1 - As)(1 + s) \approx 1 + s(1 - A) \quad (6)$$

Therefore, the reduction ratio $\beta$ for causing the rotation speed in the case of using the conventional induction motor to be equal to that in the case of using the high-efficiency induction motor is represented by the following equation (7).

$$\beta = \{1 + s(1-A)\}\alpha \quad (7)$$

When the reduction ratio $\beta$ is determined by the above equation (7), the rotation speed in the case of using the conventional induction motor becomes substantially equal to the rotation speed in the case of using the high-efficiency induction motor and the mechanical output does not change before and after the induction motor is changed. As a result, the power consumption reduction effect by improving the efficiency of the induction motor can be maximized.

Figure 6:
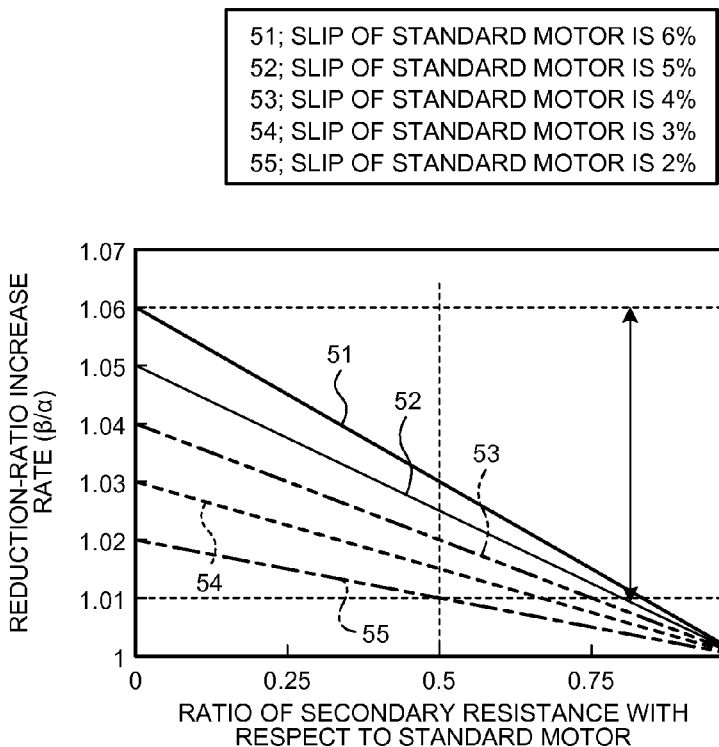
FIG. 6 is a diagram showing the reduction-ratio increase rate for causing the rotation speed in the case of using the conventional induction motor to be equal to the rotation speed in the case of using the high-efficiency induction motor when the ratio of the secondary resistance of the high-efficiency induction motor to that of the conventional induction motor and the slip "s" are used as parameters in the mechanical device according to the embodiment.

The reduction-ratio increase rate is determined on the basis of the above equation (6). FIG. 6 is a diagram showing the reduction-ratio increase rate for causing the rotation speed in the case of using the conventional induction motor to be equal to the rotation speed in the case of using the high-efficiency induction motor when the ratio of the secondary resistance of the high-efficiency induction motor to that of the conventional induction motor and the slip "s" are used as parameters. In FIG. 6, a line 51 is a line representing the reduction-ratio increase rate when the slip of a standard motor is 6%. A line 52 is a line representing the reduction-ratio increase rate when the slip of a standard motor is 5%. A line 53 is a line representing the reduction-ratio increase rate when the slip of a standard motor is 4%. A line 54 is a line representing the reduction-ratio increase rate when the slip of a standard motor is 3%. A line 55 is a line representing the reduction-ratio increase rate when the slip of a standard motor is 2%. With reference to FIG. 6, as the ratio of the secondary resistance of the high-efficiency induction motor to that of the conventional induction motor is reduced and the slip (the rated rotation speed) of the conventional induction motor is increased, the reduction-ratio increase rate for causing the rotation speed before the motor is changed to be equal to that after the induction motor is changed is increased. Specifically, assuming that the secondary resistance of the high-efficiency induction motor is approximately equal to or less than 50% of that of the conventional induction motor, the reduction ratio needs to be 1.01 to 1.06 times as large as that of the conventional induction motor.

In the present embodiment, the ratio A between the secondary resistance of the conventional induction motor and that of the high-efficiency induction motor used in the above equation (6) is calculated by performing a lock test on an induction motor, and the reduction ratio $\beta$ is calculated by the above equation (7). The lock test of an induction motor is a test where a low voltage at rated frequency is applied to the primary winding of the induction motor while the rotator of the induction motor is fixed, a locked current close to the rated current is applied to the primary winding, and the input on the primary side at this point is measured, thereby calculating the secondary resistance. By performing the lock test, it becomes possible to more accurately calculate the reduction ratio that causes the rotation speed before the motor is changed to be equal to the rotation speed after the induction motor is changed and the power consumption reduction effect by improving the efficiency of the induction motor can be maximized.

In the present embodiment, the reduction ratio $\beta$ in the case of using the high-efficiency induction motor is represented by the following equation (8) assuming that the rated rotation speed of the conventional induction motor is denoted by $N_1$, the reduction ratio in the case of using the conventional induction motor is denoted by $\alpha$, and the rated rotation speed of the high-efficiency induction motor is denoted by $N_2$.

$$\beta = \frac{N_2}{N_1}\alpha \quad (8)$$

An induction motor is almost always used approximately at the rated rotation speed, and thus by determining the reduction ratio by the above equation (8), in most cases, the rotation speed before the motor is changed becomes equal to the rotation speed after the induction motor is changed. Therefore, the power consumption reduction effect by improving the efficiency of the induction motor can be maximized.

Figure 7:
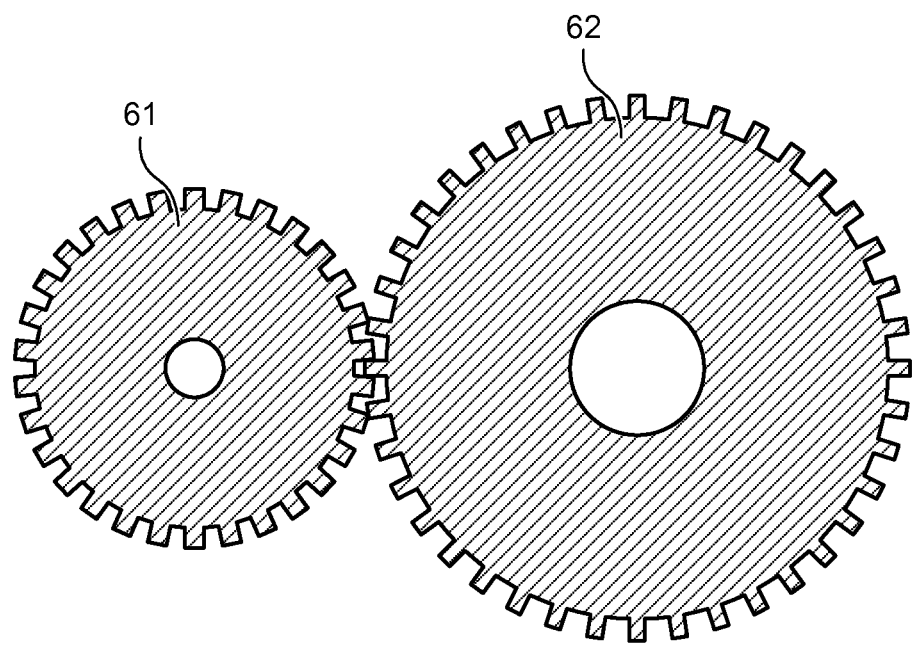
FIG. 7 is a cross-sectional view of a gear according to the embodiment.

While the present embodiment has explained that the diameter of a pulley is changed to change the reduction ratio, the present invention is not limited thereto, and it is possible to configure such that the number of gears is changed in a mechanical device in which a speed reducer has a gear mechanism (FIG. 7). FIG. 7 is a diagram showing a mode in which the present invention is applied to a gear. In FIG. 7, a gear 61 corresponds to a small-diameter pulley and a gear 62 corresponds to a large-diameter pulley. It suffices that as explained in the present embodiment, a gear change method is set such that the rotation speed in the case of using the conventional induction motor becomes equal to the rotation speed in the case of using the high-efficiency induction motor. As a result, the rotation speed does not change before and after the induction motor is changed, and thus the power consumption reduction effect by improving the efficiency of the induction motor can be maximized.

As explained above, the mechanical device according to the present embodiment is a mechanical device including an induction motor that rotates a small-diameter pulley (or a small-diameter gear) and a device including a rotation mechanism having a large-diameter pulley (or a large-diameter gear) driven by a rotation operation of the small-diameter pulley connected thereto, in which an increment in a rotation speed caused by using a high-efficiency induction motor as the induction motor is offset in the large-diameter pulley (or the large-diameter gear) by increasing a reduction ratio, which is a ratio of the diameter of the large-diameter pulley (or the large-diameter gear) to the diameter of the small-diameter pulley (or the small-diameter gear), and an increase in a rotation speed of the large-diameter pulley (or the large-diameter gear) due to the increment in a rotation speed caused by using a high-efficiency induction motor as the induction motor is suppressed. Alternatively, the mechanical device according to the present embodiment is a mechanical device including an induction motor and a speed reducer, in which a reduction ratio of the speed reducer is increased such that a rotation speed of the mechanical device itself in which a non-high-efficiency induction motor is changed to a high-efficiency induction motor is equal to a rotation speed in a case of using a non-high-efficiency induction motor before a change. With such a configuration, the power consumption reduction effect by improving the efficiency of the induction motor can be maximized.

In the mechanical device with the configuration described above, the reduction ratio can also be determined on the basis of the secondary resistance of the induction motor. For example, such a mode is represented by the above equation (7). With such a configuration, the rotation speed does not change before and after the induction motor is changed, and thus the power consumption reduction effect by improving the efficiency of the induction motor can be maximized.

In the mechanical device with the configuration described above, it is permissible that the secondary resistance of the induction motor is calculated by a lock test. With such a configuration, the reduction ratio is determined accurately and the rotation speed does not change before and after the induction motor is changed, and thus the power consumption reduction effect by improving the efficiency of the induction motor can be maximized.

In the mechanical device with the configuration described above, the reduction ratio of the induction motor can also be determined on the basis of the ratio of a rated rotation speed of the induction motor. For example, such a mode is represented by the above equation (8). With such a configuration, the rotation speed does not change before and after the induction motor is changed, and thus the power consumption reduction effect by improving the efficiency of the induction motor can be maximized.

In the mechanical device with the configuration described above, it is permissible that the reduction ratio, which is a ratio of the diameter of the large-diameter pulley to the diameter of the small-diameter pulley, is determined to be equal to or larger than 1.0% and equal to or smaller than 6.0% depending on the increment in a rotation speed caused by using a high-efficiency induction motor as the induction motor. With such a configuration, the energy saving effect by improving the efficiency of the motor can be maximized.

Alternatively, in a mechanical device with a configuration identical to the configuration described above, an increment in a rotation speed caused by using a high-efficiency induction motor as the induction motor can be offset in the large-diameter pulley not by increasing the reduction ratio, which is a ratio of the diameter of the large-diameter pulley to the diameter of the small-diameter pulley, but by reducing the frequency of a power supply that supplies power to the induction motor. That is, in a mechanical device including an induction motor and a speed reduction mechanism, when a conventional induction motor that uses a variable frequency power supply such as an inverter is changed to a high-efficiency induction motor, it is desirable that the output frequency of the inverter is reduced such that the rotation speed of the mechanical device is equal to the rotation speed in a case of using the conventional induction motor. The output frequency of the inverter is reduced such that the rotation speed of the mechanical device is equal to the rotation speed in a case of using the conventional induction motor. Specifically, the output frequency of the inverter is reduced by 1/β or approximately 1.0 to 6.0% by using the above equation (7) and the like. Accordingly, the rotation speed does not change before and after the induction motor is changed, and thus the power consumption reduction effect by improving the efficiency of the induction motor can be maximized.

INDUSTRIAL APPLICABILITY

As described above, the mechanical device according to the present invention is useful as a device including an induction motor.

REFERENCE SIGNS LIST 21 induction motor, 22 pump, 23 belt, 31 small-diameter pulley, 32 large-diameter pulley, 41 to 44 curve, 51 to 55 line, 61, 62 gear.

The invention claimed is:
1. A mechanical device comprising:
an induction motor that rotates a small-diameter pulley; and
a device including a rotation mechanism having a large-diameter pulley driven by a rotation operation of the small-diameter pulley connected thereto, said large diameter pulley being driven by rotation of said small diameter pulley in accordance with a reduction ratio, which is a ratio of a diameter of said large diameter pulley to a diameter of said small diameter pulley, wherein an increment in a rotation speed caused by using a high-efficiency induction motor as the induction motor is offset in the large-diameter pulley by increasing said reduction ratio, and an increase in a rotation speed of the large-diameter pulley due to the increment in a rotation speed caused by using a high-efficiency induction motor as the induction motor is suppressed, wherein said reduction ratio is increased by an amount equal to or larger than 1.0% and equal to or smaller than 6.0% depending on the increment in a rotation speed caused by using a high-efficiency induction motor as the induction motor.

2. The mechanical device according to claim 1, wherein the reduction ratio increase is determined on a basis of a secondary resistance of the induction motor.

3. The mechanical device according to claim 2, wherein the secondary resistance of the induction motor is calculated by a lock test.

4. The mechanical device according to claim 1, wherein the reduction ratio increase is determined on a basis of a ratio of a rated rotation speed of the high-efficiency induction motor and a non-high efficiency induction motor.

5. A mechanical device comprising:

an induction motor that rotates a small-diameter gear; and a device including a rotation mechanism having a large-diameter gear driven by a rotation operation of the small-diameter gear connected thereto, said large diameter gear being driven by rotation of said small diameter gear in accordance with a reduction ratio, which is a ratio of a diameter of said large diameter gear to a diameter of said small diameter gear, wherein an increment in a rotation speed caused by using a high-efficiency induction motor as the induction motor is offset in the large-diameter gear by increasing said reduction ratio, and an increase in a rotation speed of the large-diameter gear due to the increment in a rotation speed caused by using a high-efficiency induction motor as the induction motor is suppressed, wherein said reduction ratio is by an amount equal to or larger than 1.0% and equal to or smaller than 6.0% depending on the increment in a rotation speed caused by using a high-efficiency induction motor as the induction motor.

6. The mechanical device according to claim 5, wherein the reduction ratio increase is determined on a basis of a ratio of a secondary resistance of the high-efficiency induction motor and a non-high-efficiency induction motor.

7. The mechanical device according to claim 6, wherein the secondary resistance of the induction motor is calculated by a lock test.

8. The mechanical device according to claim 5, wherein the reduction ratio of the induction motor is determined on a basis of a ratio of a rated rotation speed of the high-efficiency induction motor and a non-high-efficiency induction motor.

9. A mechanical device comprising:

an induction motor that rotates a small-diameter pulley; and a device including a rotation mechanism having a large-diameter pulley driven by a rotation operation of the small-diameter pulley connected thereto, said large diameter pulley being driven by rotation of said small diameter pulley in accordance with a reduction ratio, which is a ratio of a diameter of said large diameter pulley to a diameter of said small diameter pulley, wherein an increment in a rotation speed caused by using a high-efficiency induction motor as the induction motor is offset in the large-diameter pulley by reducing a frequency of a power supply that supplies power to the induction motor, and an increase in a rotation speed of the large-diameter pulley due to the increment in a rotation speed caused by using a high-efficiency induction motor as the induction motor is suppressed, wherein the frequency reduction of said power supply is determined to be equal to or larger than 1.0% and equal to or smaller than 6.0% depending on the increment in a rotation speed caused by using a high-efficiency induction motor as the induction motor.

10. A mechanical device comprising:

an induction motor that rotates a small-diameter gear; and a device including a rotation mechanism having a large-diameter gear driven by a rotation operation of the small-diameter gear connected thereto, said large diameter gear being driven by rotation of said small diameter gear in accordance with a reduction ratio, which is a ratio of a diameter of said large diameter gear to a diameter of said small diameter gear, wherein an increment in a rotation speed caused by using a high-efficiency induction motor as the induction motor is offset in the large-diameter gear by reducing a frequency of a power supply that supplies power to the induction motor, and an increase in a rotation speed of the large-diameter gear due to the increment in a rotation speed caused by using a high-efficiency induction motor as the induction motor is suppressed, wherein the frequency reduction of said power supply is determined to be equal to or larger than 1.0% and equal to or smaller than 6.0% depending on the increment in a rotation speed caused by using the high-efficiency induction motor as the induction motor.

11. A mechanical device comprising:

an induction motor; and a speed reducer comprising a large diameter gear driven in response to rotation of a small diameter and a small diameter gear, said large diameter gear being driven by rotation of said small diameter gear in accordance with a reduction ratio, which is a ratio of a diameter of said large diameter gear to a diameter of said small diameter gear, wherein the reduction ratio of the speed reducer is increased such that a rotation speed of the mechanical device itself in which a non-high-efficiency induction motor is changed to a high-efficiency induction motor is equal to a rotation speed in a case of using a non-high-efficiency induction motor before a change, wherein the reduction ratio, is increased by an amount equal to or larger than 1.0% and equal to or smaller than 6.0% depending on the increment in a rotation speed caused by using the high-efficiency induction motor as the induction motor.

* * * * *